United States Patent
Fujii et al.

(10) Patent No.: US 9,884,645 B2
(45) Date of Patent: Feb. 6, 2018

(54) LANE CHANGE CONTROL SYSTEM

(71) Applicant: HONDA MOTOR CO., LTD., Tokyo (JP)

(72) Inventors: Satoshi Fujii, Wako (JP); Haruhiko Nishiguchi, Wako (JP); Ryohsaku Arakawa, Wako (JP); Daisuke Kubota, Wako (JP); Kei Oshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/365,180

(22) Filed: Nov. 30, 2016

(65) Prior Publication Data

US 2017/0151982 A1 Jun. 1, 2017

(30) Foreign Application Priority Data

Dec. 1, 2015 (JP) ................................. 2015-234439

(51) Int. Cl.
*B60W 10/20* (2006.01)
*B62D 15/02* (2006.01)
*G06K 9/00* (2006.01)

(52) U.S. Cl.
CPC ......... *B62D 15/0255* (2013.01); *B60W 10/20* (2013.01); *G06K 9/00805* (2013.01); *B60W 2420/42* (2013.01)

(58) Field of Classification Search
None
See application file for complete search history.

(56) References Cited

U.S. PATENT DOCUMENTS

| | | | |
|---|---|---|---|
| 6,853,906 B1 * | 2/2005 | Michi | B60K 31/0008 701/410 |
| 9,224,299 B2 * | 12/2015 | Taguchi | G08G 1/163 |
| 9,229,453 B1 * | 1/2016 | Lee | G05D 1/0214 |
| 9,620,008 B2 * | 4/2017 | Schmudderich | B60W 40/04 |
| 9,623,874 B2 * | 4/2017 | Baek | B60W 40/09 |
| 2003/0220738 A1 * | 11/2003 | Abe | B60T 7/22 701/301 |
| 2004/0153228 A1 * | 8/2004 | Matsumoto | B60T 8/17552 701/41 |
| 2004/0158377 A1 * | 8/2004 | Matsumoto | B60T 8/17557 701/48 |

(Continued)

FOREIGN PATENT DOCUMENTS

| | | |
|---|---|---|
| JP | 2002-279599 A | 9/2002 |
| JP | 2008-12989 A | 1/2008 |
| JP | 2012-146142 A | 8/2012 |

OTHER PUBLICATIONS

Office Action dated Sep. 5, 2017, issued in counterpart Japanese Application No. 2015-234439, with English translation (8 pages).

*Primary Examiner* — Jonathan M Dager
(74) *Attorney, Agent, or Firm* — Westerman, Hattori, Daniels & Adrian, LLP (57) ABSTRACT

When an object detected by a lane marking/object detection section has been determined to be an object present in an adjacent lane change target lane or in the vicinity of the adjacent lane, lane change control is performed to reduce a predetermined maximum lateral acceleration Aymax' or maximum lateral velocity Vymax' according to the lane width Lob of the adjacent lane.

6 Claims, 7 Drawing Sheets

(56) References Cited

U.S. PATENT DOCUMENTS

| | | | | |
|---|---|---|---|---|
| 2005/0096827 A1* | 5/2005 | Sadano | B60T 7/22 | 701/70 |
| 2005/0251323 A1* | 11/2005 | Heinrichs-Bartscher | B60K 31/0008 | 701/117 |
| 2006/0178789 A1* | 8/2006 | Kuge | B60W 40/09 | 701/1 |
| 2008/0172153 A1* | 7/2008 | Ozaki | B60T 8/17557 | 701/36 |
| 2008/0303696 A1* | 12/2008 | Aso | G08G 1/161 | 340/935 |
| 2011/0313665 A1* | 12/2011 | Lueke | G01S 13/931 | 701/301 |
| 2012/0242972 A1* | 9/2012 | Wee | G01S 7/486 | 356/4.01 |
| 2013/0054106 A1* | 2/2013 | Schmudderich | B60W 30/0956 | 701/96 |
| 2013/0085976 A1* | 4/2013 | Bone | B60W 30/18163 | 706/46 |
| 2013/0179036 A1* | 7/2013 | Lee | B62D 15/0255 | 701/41 |
| 2013/0314503 A1* | 11/2013 | Nix | G06K 9/00805 | 348/46 |
| 2014/0032049 A1* | 1/2014 | Moshchuk | B62D 15/0265 | 701/42 |
| 2014/0074356 A1* | 3/2014 | Bone | G08G 1/167 | 701/41 |
| 2014/0297172 A1* | 10/2014 | Huelsen | G01S 13/931 | 701/301 |
| 2014/0300731 A1* | 10/2014 | Takemura | B60W 50/06 | 348/116 |
| 2015/0120137 A1* | 4/2015 | Zeng | G05D 1/024 | 701/41 |
| 2015/0148985 A1* | 5/2015 | Jo | G08G 1/096725 | 701/1 |
| 2015/0321699 A1* | 11/2015 | Rebhan | B60Q 9/00 | 701/23 |
| 2015/0344068 A1* | 12/2015 | Taniguchi | B62D 15/025 | 701/41 |
| 2015/0353082 A1* | 12/2015 | Lee | B60W 30/09 | 701/41 |
| 2015/0353085 A1* | 12/2015 | Lee | B60W 30/10 | 701/533 |
| 2016/0063858 A1* | 3/2016 | Schmudderich | B60W 40/04 | 701/117 |
| 2016/0107682 A1* | 4/2016 | Tan | B62D 6/00 | 701/41 |
| 2016/0185388 A1* | 6/2016 | Sim | B62D 15/0255 | 701/41 |
| 2016/0264045 A1* | 9/2016 | Ng-Thow-Hing | B60Q 9/00 | 348/116 |
| 2017/0232970 A1* | 8/2017 | Schaper | B60W 30/18163 | 701/36 |

\* cited by examiner

LANE CHANGE CONTROL SYSTEM

CROSS REFERENCES TO RELATED APPLICATIONS

The present application claims priority under 35 U.S.C. §119 to Japanese Patent Application No. 2015-234439, filed Dec. 1, 2015, entitled "Lane Change Control System." The contents of this application are incorporated herein by reference in their entirety.

BACKGROUND

1. Field

The present disclosure relates to a lane change control system that controls vehicle lane changing.

2. Description of the Related Art

Japanese Unexamined Patent Application Publication No. 2008-12989 describes a lane change assist system that assists lane change of a vehicle. The lane change assist system uses a camera to capture an image of the road ahead of the vehicle in a direction of progress and identify white lines on both left and right sides, acquires a lane width from the white lines, computes a curve radius and the like, and calculates a target yaw rate (see [0023], [0024], [0025], Equation 2, [0053], and [0054] in Japanese Unexamined Patent Application Publication No. 2008-12989).

Paragraph [0016] in Japanese Unexamined Patent Application Publication No. 2008-12989 describes that the vehicle can be guided from a current driving lane to a lane change target lane by performing steering control that takes the lane width into account, thereby enabling lane change to be assisted.

However, Japanese Unexamined Patent Application Publication No. 2008-12989 does not consider cases in which objects are present either in the lane change target lane or in the vicinity of the lane change target lane. There is accordingly room for improvement since it may not be possible to perform lane changing appropriately, which could, for example, alarm an occupant of the vehicle that is attempting to change lanes (that is in the process of changing lanes).

SUMMARY

The present disclosure provides a lane change control system capable of performing lane change control appropriately in cases in which an object is present in a lane change target lane or in the vicinity thereof.

The present disclosure describes a lane change control system including: a surrounding environment acquisition section that acquires information of a surrounding environment such as, typically, a captured image data of a surrounding environment at least in front of a vehicle; a lane marking/object detection section that detects a lane marking and an object in the acquired surrounding environment; a lane change controller that controls lane changing of the vehicle according to the lane marking and object detected; and an object determination section that determines whether or not the object detected in the surrounding environment is present in a lane change target lane or in the vicinity of the lane change target lane. The lane change controller reduces a predetermined lateral acceleration or lateral velocity in cases in which the detected object has been determined to be an object present in the lane change target lane or in the vicinity of the lane change target lane, and performs lane change control.

In the present disclosure, the predetermined lateral acceleration or lateral velocity is reduced during lane change control in cases in which the object detected by the lane marking/object detection section is determined to be an object present in the lane change target lane or in the vicinity of the lane change target lane. Accordingly, it is possible to avoid alarming an occupant of the vehicle that is attempting to change lanes, and lane change control can be performed appropriately.

In such cases, configuration may be made in which the object determination section further includes functionality to classify the detected object by type; and the lane change controller changes a reduction ratio of the lateral acceleration or the lateral velocity according to the type of the object classified by the object determination section. This thereby enables an appropriate reduction ratio to be set for the lateral acceleration or the lateral velocity according to the type of the classified object.

Moreover, configuration may be made in which the lane change controller changes the reduction ratio such that the lateral acceleration or the lateral velocity is smaller in cases in which the detected object is classified as a person than as an object other than a person. This thereby avoids alarming the person present in or in the vicinity of the lane into which the vehicle is attempting to change, and at the same time, avoids alarming occupants of the vehicle that is attempting to change lanes.

In particular, configuration may be made in which the reduction ratio is changed such that the lateral acceleration or the lateral velocity is smaller in cases in which the person detected and classified has been classified as a person riding a bicycle than as a pedestrian. This thereby avoids alarming the person riding a bicycle in, or in the vicinity of, the lane into which the vehicle is attempting to change, and at the same time, avoids alarming occupants of the vehicle that is attempting to change lanes.

Note that configuration may be made in which the predetermined lateral acceleration or lateral velocity is set to a lateral acceleration or lateral velocity that becomes smaller in value the narrower a lane change target lane width. This thereby enables lane change to be controlled at an appropriate speed that neither alarms the occupant, nor feels slow to the occupant.

Moreover, configuration may be made in which the reduction ratio is changed such that the lateral acceleration or the lateral velocity is smaller in cases in which the detected object has been determined to be an object present in the lane change target lane or in the vicinity of the lane change target lane and the object has been determined to be a stationary vehicle from which there is a possibility of an occupant exiting, than when the object has been determined to be a stationary vehicle from which there is no possibility of the occupant exiting. This thereby enables an appropriate lateral acceleration or lateral velocity to be set even when there is a possibility that the door of a stationary vehicle may open.

DESCRIPTION OF THE PREFERRED EMBODIMENTS

Detailed explanation follows regarding a preferred exemplary embodiment of a lane change control system according to the present disclosure, with reference to the accompanying drawings.

Figure 1:
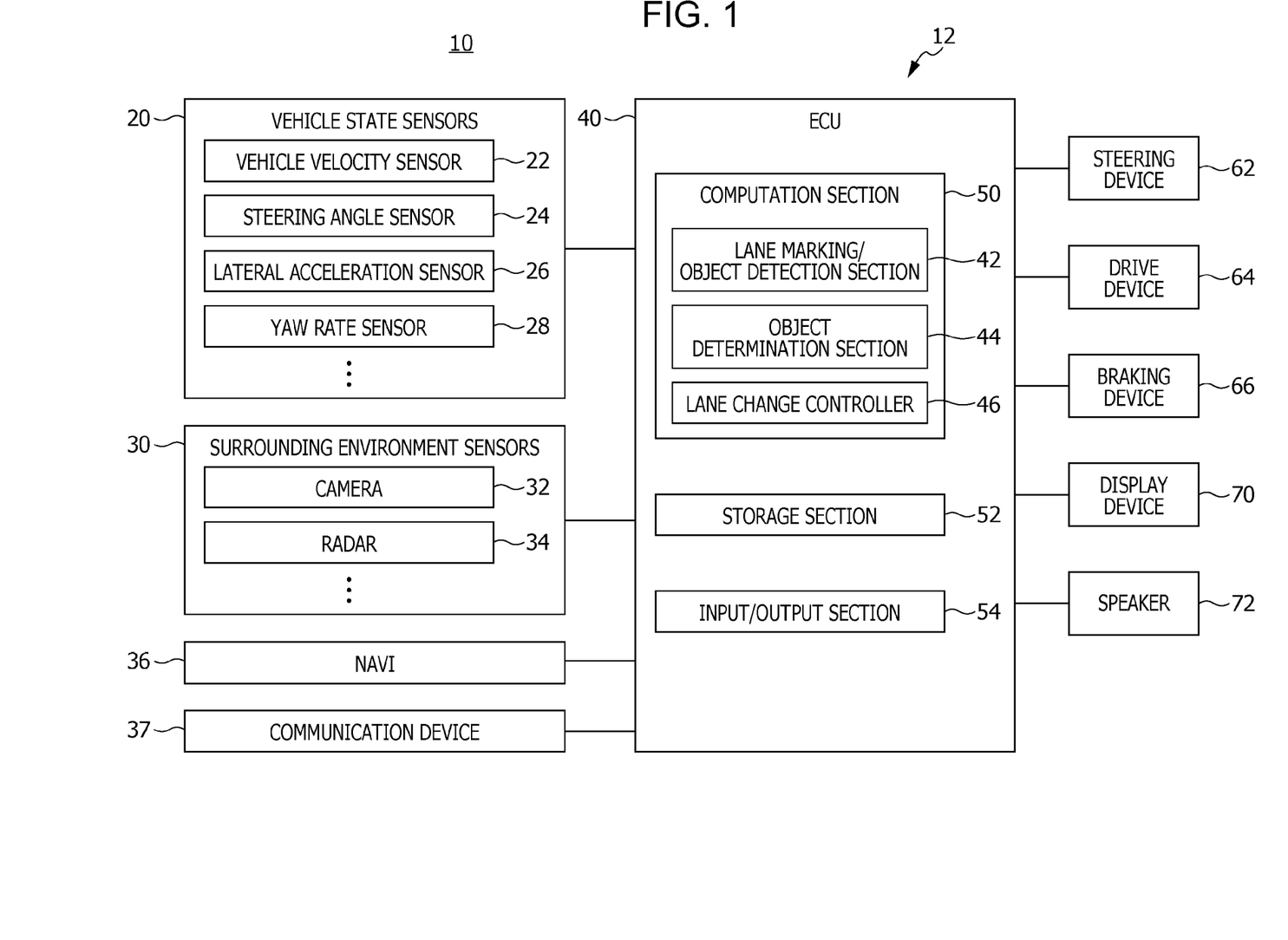
FIG. 1 is a block diagram illustrating configuration of a vehicle installed with a lane change control system according to an embodiment.

FIG. 1 is a block diagram illustrating configuration of a vehicle 10 installed with a lane change control system 12 according to the present embodiment.

The vehicle 10 is capable of switching operation between that of an automatically driven (encompassing automatically drive-assistance) vehicle, or that of a manually driven vehicle. In the present embodiment, the vehicle 10 functions as an automatically driven (encompassing automatically drive-assistance) vehicle.

As illustrated in FIG. 1, the lane change control system 12 fundamentally includes vehicle state sensors 20, surrounding environment sensors 30, a navigation device (NAVI) 36, a communication device 37, an electronic control unit 40 (referred to below as the ECU 40), a steering device 62, a drive device 64, a braking device 66, a display device 70, and a speaker 72.

The ECU 40 is a computer including a microcomputer, and includes a Central Processing Unit (CPU), ROM (encompassing EEPROM) as memory, and Random Access Memory (RAM), as well as input/output devices such as an A/D converter and a D/A converter, a timer serving as a clock, and the like. The ECU 40 functions as various functional execution sections (functional execution units) by reading and executing programs stored in the ROM with the CPU.

More specifically, in the lane change control system 12, the ECU 40 functions as a computation section 50 including a lane marking/object detection section 42, an object determination section 44, and a lane change controller 46. The ECU 40 also functions as a storage section 52, an input/output section 54, and the like.

The vehicle state sensors 20 include, for example, a vehicle velocity sensor 22, a steering angle sensor 24, a lateral acceleration sensor 26, and a yaw rate sensor 28, and detect information relating to states of the vehicle 10. The vehicle state sensors 20 function as a vehicle state detection section.

The surrounding environment sensors 30 include, for example, a camera 32 and a radar 34, and detect information relating to the surrounding environment in front of, to the sides of, and behind the vehicle 10, for example. The surrounding environment sensors 30 function as a surrounding environment acquisition section.

The vehicle velocity sensor 22 detects a vehicle velocity V (m/s) of the vehicle 10 and outputs the vehicle velocity V to the ECU 40. The steering angle sensor 24 detects a steering angle θ (rad) of the vehicle 10 and outputs the steering angle θ to the ECU 40.

The lateral acceleration sensor 26 detects a lateral acceleration GI (m/s$^2$), this being acceleration arising in a lateral direction (width direction) of the vehicle 10, and outputs the lateral acceleration GI to the ECU 40. The lateral acceleration sensor 26 is provided substantially at the position of a center of gravity at a central section of the vehicle 10 (vehicle body). Alternatively, the lateral acceleration sensor 26 may be provided at locations supporting the respective wheels, not illustrated in the drawings.

The yaw rate sensor 28 detects a yaw rate Yr (rad/s), this being a rotational angular velocity about a vertical axis of the vehicle 10, and outputs the yaw rate Yr to the ECU 40. The yaw rate sensor 28 is provided substantially at the position of the center of gravity at the central section of the vehicle 10 (vehicle body).

The camera 32 (image capture unit) is, for example, a solid state camera employing a solid state image sensor such as a CCD camera or a CMOS camera (and may also be an infrared camera). The camera 32 acquires images of the surroundings (for example of objects such as other vehicles, pedestrians, or animals, as well as lane markings) around at least the front of the vehicle 10. The camera 32 outputs signals corresponding to the images of the surroundings to the ECU 40.

The radar 34 outputs transmission waves, which are electromagnetic waves (millimeter waves here), to the exterior of the vehicle 10, including at least in front of the vehicle 10, and receives reflected waves that are waves from out of the transmission waves that have been reflected back by detected objects (for example objects such as other vehicles and pedestrians). The radar 34 outputs signals corresponding to the reflected waves to the ECU 40.

The navigation device 36 detects a current position of the vehicle 10 using a satellite system such as a Global Positioning System (GPS), and guides a user (occupant) along a route to a destination. The navigation device 36 also includes a storage device stored with road map information. The navigation device 36 detects or finds the current position of the vehicle 10 based on position information from GPS satellites and the road map information stored in the storage device.

From the perspective that the navigation device 36 detects the current position of the vehicle 10, the navigation device 36 may be considered to be one of the vehicle state sensors 20. The navigation device 36 may also be considered to be one of the surrounding environment sensors 30 that detect surrounding environment information, which is information relating to the surrounding environment around the vehicle 10, and includes traffic rules and road restrictions around the current position of the vehicle 10.

In FIG. 1, the navigation device 36 is envisaged as being a type that is attached to the vehicle 10. However, there is no limitation thereto, and a portable information terminal such as a smartphone may be employed as the navigation device 36. Moreover, the road map information may be stored in an external server (not illustrated in the drawings), and provided to the navigation device 36 as required.

The communication device 37 performs wireless communication with vehicles other than the vehicle 10 and with external devices such as external servers (including, for example, roadside optical beacons, and remote external terminals), either directly or via a mobile communication network such as the Internet.

The display device 70 performs display relating to automatic driving and the like. The display device 70 may, for example, configure part of an instrument panel meter, not illustrated in the drawings. Alternatively, the display device 70 may double as a display section of the navigation device 36.

The speaker 72 outputs audio (such as audio guidance) relating to automatic driving and the like. The speaker 72 may configure part of an audio device, not illustrated in the drawings, or of the navigation device 36.

The lane change controller 46 performs control that is necessary when the vehicle 10 is traveling under automatic driving.

More specifically, the lane change controller 46 generates a lane change path command Tcom based on vehicle state information indicating a state of the vehicle 10 detected by the vehicle state sensors 20, or based on information obtained therefrom as well as information relating to the surrounding environment of the vehicle 10 detected by the surrounding environment sensors 30. The lane change controller 46 then performs lane change control for the vehicle 10 by controlling the steering device 62, the drive device 64, and the braking device 66 based on the lane change path command Tcom.

Note that the vehicle state information indicating a state of the vehicle 10 detected by the vehicle state sensors 20, or the information obtained therefrom, is, for example, a vehicle velocity Vx and acceleration Ax of the vehicle 10 in a lane direction (road length direction) X, and a vehicle velocity (also referred to as lateral velocity) Vy and acceleration (also referred to as lateral acceleration) Ay of the vehicle 10 in a direction (road width direction or lane width direction) Y that is orthogonal to the lane direction X.

Moreover, the surrounding environment information, which is information relating to the surrounding environment of the vehicle 10 detected by the surrounding environment sensors 30, is, for example, information relating to a lane width of the current lane (the lane in which the vehicle 10 is traveling) as well as a lane change target lane width (also referred to as the adjacent lane width) Llane, and information relating to objects in the current lane (the lane in which the vehicle 10 is traveling) as well as objects in the lane change target lane (also referred to as the adjacent lane) and/or objects in the vicinity of the adjacent lane (also referred to as adjacent object information) Obinfo.

The adjacent lane width Llane and the adjacent object information Obinfo are also referred to collectively as adjacent lane information Llaneinfo.

The lane change controller 46 accordingly generates the lane change path command Tcom based on the adjacent lane information Llaneinfo (=adjacent lane width information Llane+adjacent object information Obinfo), and performs lane change control by controlling the steering device 62, the drive device 64, and the braking device 66 based on the lane change path command Tcom.

Figure 2A:
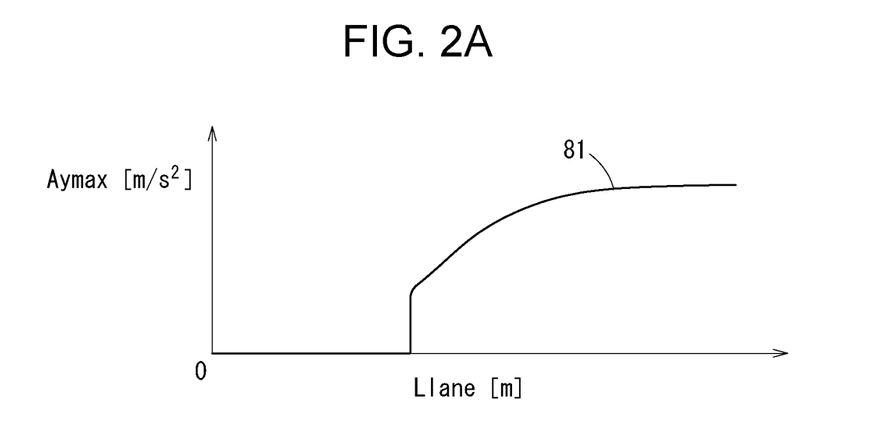
FIG. 2A is a graph illustrating characteristics of a maximum lateral acceleration of a vehicle in a lane width direction with respect to an adjacent lane width.
Figure 2B:
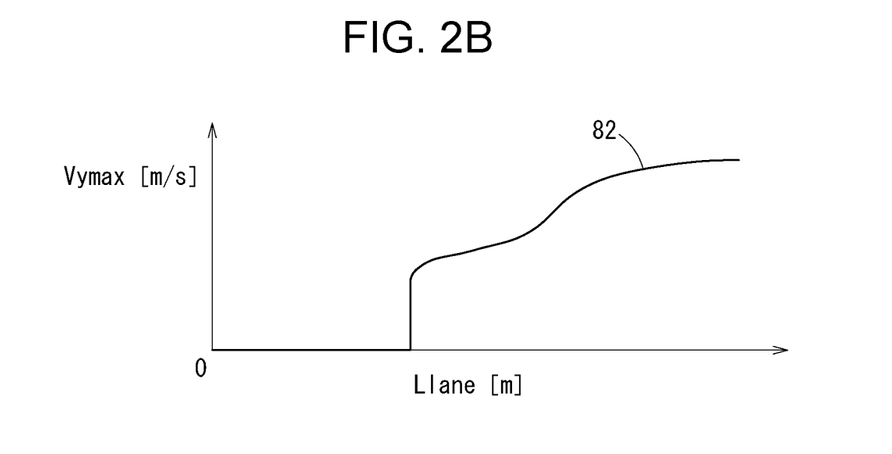
FIG. 2B is a graph illustrating characteristics of a maximum lateral velocity of a vehicle in a lane width direction with respect to an adjacent lane width.

Note that during generation of the lane change path command Tcom, the lane change controller 46 refers to characteristics 81, illustrated in FIG. 2A, of a maximum lateral acceleration Aymax (m/s$^2$) of the vehicle 10 in the lane width direction Y with respect to the adjacent lane width Llane, or to characteristics 82, illustrated in FIG. 2B, of a maximum lateral velocity Vymax (m/s) of the vehicle 10 in the lane width direction Y with respect to the adjacent lane width Llane (m). The characteristics 81 and the characteristics 82 are stored in the storage section 52.

The characteristics 81 may be stored in the storage section 52 as a function famax(Llane) of the adjacent lane width Llane as expressed in Equation 1 below, and the characteristics 82 may be stored in the storage section 52 as a function fvmax(Llane) of the adjacent lane width Llane as expressed in Equation 2 below.

$$A y\max = f a\max(L\text{lane}) \tag{1}$$

$$V y\max = f v\max(L\text{lane}) \tag{2}$$

The steering device 62 includes an Electric Power Steering (EPS) system, and switches the direction of progress (steering angle θ) of the vehicle 10 based on the lane change path command Tcom from the lane change controller 46 and the like, and also applies steering power to the vehicle 10.

The drive device 64 generates drive force of the vehicle 10 based on the lane change path command Tcom from the lane change controller 46 and the like. In cases in which the vehicle 10 is an engine-powered vehicle, the drive device 64 includes, for example, an engine and a transmission, not illustrated in the drawings. Alternatively, in cases in which the vehicle 10 falls under the narrow definition of a battery vehicle, the drive device 64 includes, for example, a traction motor and a transmission, not illustrated in the drawings.

The braking device 66 generates braking force of the vehicle 10 based on the lane change path command Tcom from the lane change controller 46 and the like. The braking device 66 includes an Anti-Lock Braking System (ABS), and also includes, for example, brake discs, brake calipers, and hydraulic mechanisms, not illustrated in the drawings. Moreover, in cases in which the vehicle 10 is an electric vehicle provided with a traction motor, not illustrated in the drawings, the braking device 66 may include part of the traction motor employed for regenerative braking. Here, "electric vehicle" is not limited to the narrow definition of battery vehicles, and encompasses hybrid vehicles, fuel cell vehicles, and the like.

The input/output section 54 is employed to input and output signals between the ECU 40 and the vehicle state sensors 20, the surrounding environment sensors 30, the navigation device 36, the communication device 37, the steering device 62, the drive device 64, the braking device 66, the display device 70, and the speaker 72.

The computation section 50 computes based on information input from the vehicle state sensors 20, the surrounding environment sensors 30, and the like, and generates signals to be output to the steering device 62, the drive device 64, the braking device 66, the display device 70, and the speaker 72 based on the computation results.

As illustrated in FIG. 1, the computation section 50 includes the lane marking/object detection section 42, the object determination section 44, and the lane change controller 46 described above.

Next, explanation follows regarding fundamental operation of the lane change control system 12 of the vehicle 10 configured as described above, with reference to the flowchart of FIG. 3. The program illustrated in the flowchart is executed by the (CPU of) the ECU 40. However, since the explanation would become difficult to follow if each element of the processing were to be explained in terms of being executed by the ECU 40, this is only mentioned where necessary. The processing in the flowchart is executed at a specific cycle.

Figure 3:
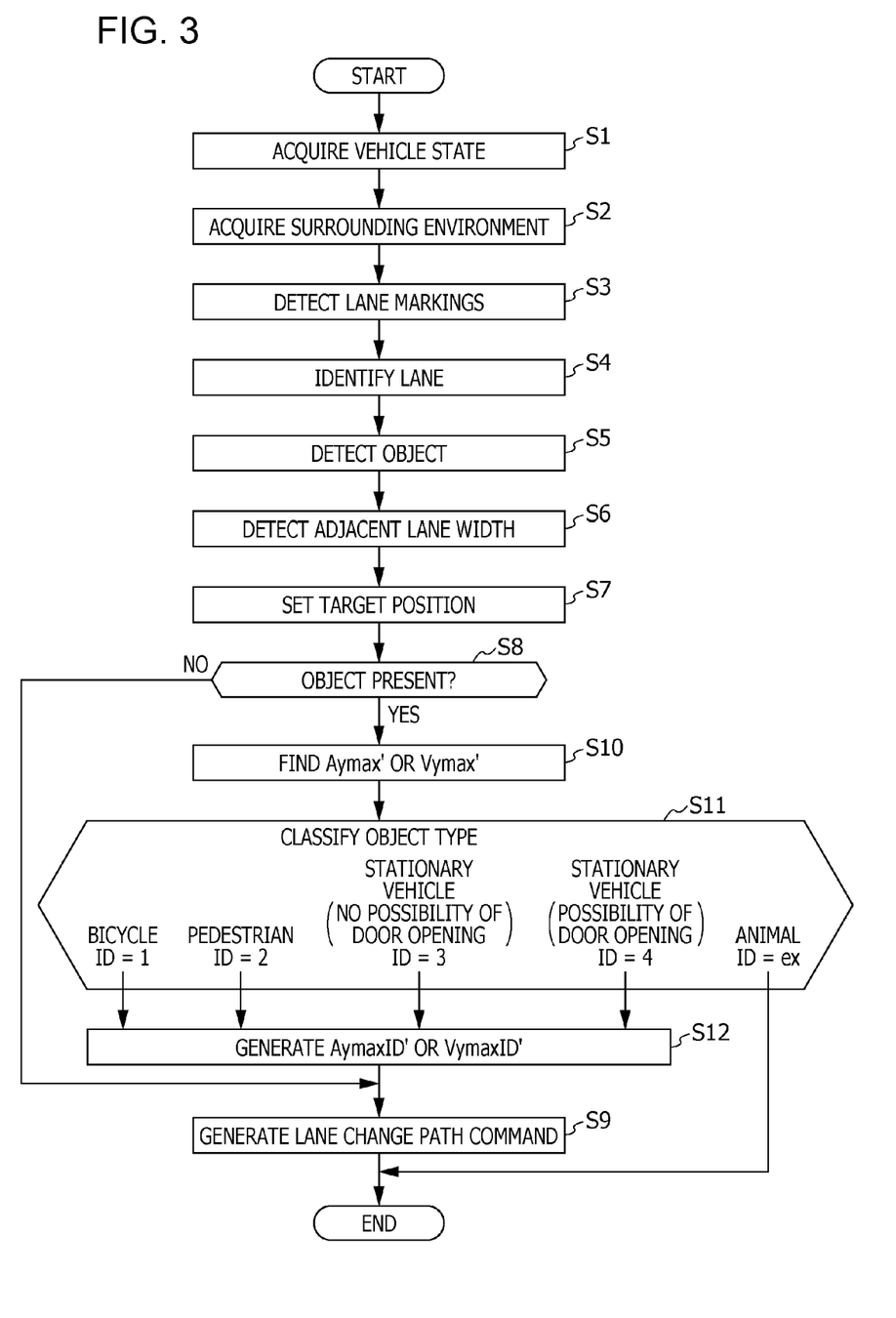
FIG. 3 is a flowchart to assist explanation of operation of a lane change control system according to an embodiment.

At step S1, the ECU 40 uses the vehicle state sensors 20 to acquire vehicle states such as the vehicle velocity Vs, the steering angle θ, a lateral acceleration Ayreal, and a yaw rate Yrreal.

At step S2, the ECU 40 uses the surrounding environment sensors 30 to acquire signals carrying image information of the surrounding environment captured by the camera 32, and signals carrying object information for the surrounding environment detected by the radar 34.

At step S3, the lane marking/object detection section 42 detects lane markings using a known method, as described later, and at step S4, identifies a lane.

The lane markings are markings indicating lane boundaries (lane partitions), and the lane markings encompass continuous lines (also referred to as lines that are continuous in effect) made up from intermittent white lines (line segments) provided at intervals, and continuous lines configured by solid white lines or the like, as well as continuous markings (these may be thought of as markings that are continuous in effect) such as Botts' dots or cats' eyes.

In such cases, at step S3, the lane marking/object detection section 42 acquires images of a specific luminance or greater (in which the brightness of the road surface is a specific brightness or greater) from images captured by the camera 32. The lane marking/object detection section 42 performs differential processing while scanning an overall image (actually, portions of the image in which lane markings are present) in a horizontal direction at respective detection lines spaced a uniform distance apart from each other in a direction X (forward direction), so as to extract edges (edge images) from the overall image starting from the vehicle 10 side (base coordinate side).

Moreover, at step S3 the lane marking/object detection section 42 extracts images exhibiting the characteristics of lane markings from the overall extracted images.

Next, at step S4, the lane marking/object detection section 42 identifies lanes (the current lane and the adjacent lane) made up of images exhibiting the characteristics of lane markings, in other words, made up of lines of characteristic dots that exhibit the characteristics of lane markings (when on a straight road, spacings of the lines of dots in the forward direction of the vehicle 10 correspond to uniformly distanced spacings). The lane marking/object detection section 42 also identifies lane widths of the respective lanes (lane widths of the current lane and the adjacent lane).

At substantially the same time as step S4, at step S5, based on signals carrying image information of the surrounding environment captured by the camera 32 and signals carrying object information of the surrounding environment detected by the radar 34 acquired through the surrounding environment sensors 30 at step S2, the lane marking/object detection section 42 detect objects, in this case pedestrians, moving bicycles being pedaled by cyclists, stationary vehicles, and animals, using a known method such as what is referred to as pattern matching, in which respective characteristics such as shapes are compared against characteristics such as shapes stored in advance in the storage section 52.

Next, at step S6, the adjacent lane width Llane is detected, taking any detected objects into consideration.

Figure 4A:
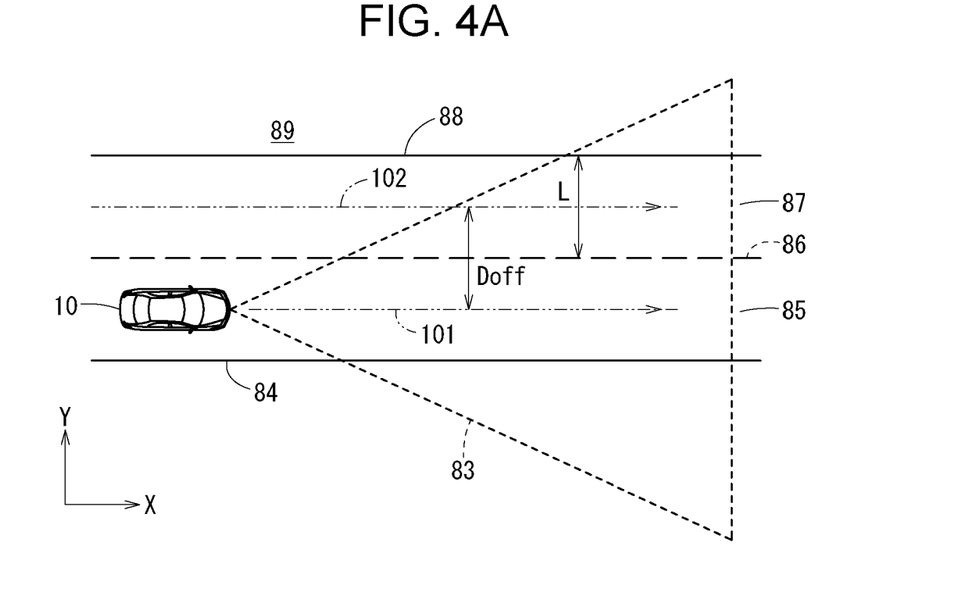
FIG. 4A is an explanatory diagram illustrating a state in which there is no object present in a lane change target lane, and a vehicle is traveling in a direction X along a lane near a median strip.

FIG. 4A illustrates a state in which the vehicle 10 is traveling in the direction X along a lane (also referred to as the current lane) 85 near a median strip 84. Out of a lane (current lane, also referred to as the pre-change lane) 85 and a lane (also referred to as the adjacent lane) 87 detected or identified in a detection range 83 of the camera 32 and the radar 34, the adjacent lane width Llane, this being the lane width of the lane change target lane (adjacent lane) 87, is detected as L. Note that the lane 85 is formed between the median strip 84 and a lane boundary line 86, and the adjacent lane 87 is formed between the lane boundary line 86 and a roadside (shoulder) 89 side lane boundary line 88. In FIG. 4A, no objects have been detected in the adjacent lane 87 within the detection range 83.

Figure 4B:
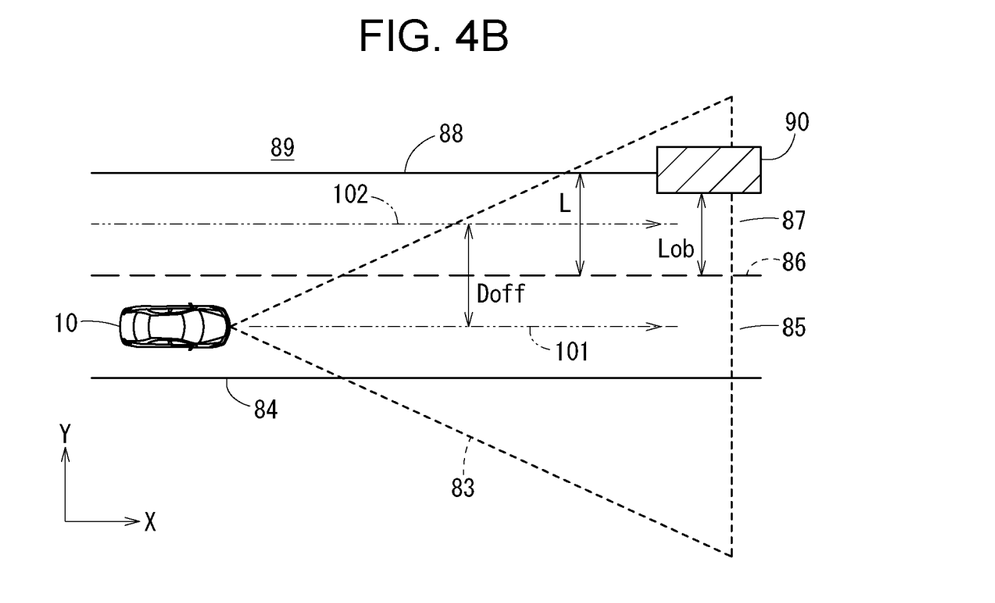
FIG. 4B is an explanatory diagram illustrating a state in which an object is present in a lane change target lane, and a vehicle is traveling in a direction X along a lane near a median strip.

As illustrated in FIG. 4B, when an object 90 is detected in the adjacent lane 87 at step S5, at step S6, the adjacent lane width Llane is detected as Llane=Lob by adjusting for the amount that the object 90 sticks out into the side of the adjacent lane 87.

Note that although not illustrated in the drawings, if, for example, a vehicle parked at the roadside 89 outside of the lane boundary line 88 of the adjacent lane 87 were to be detected or identified in the detection range 83 in FIG. 4A and FIG. 4B, this vehicle would be detected as an object. In such cases, the adjacent lane width Llane would be detected (treated) as Llane=L.

Namely, objects inside the lane boundary line 88 (on the adjacent lane 87 side, within the adjacent lane 87), objects outside the lane boundary line 88 (on the roadside 89 side), and objects straddling the lane boundary line 88 are all candidates for the object 90 detected or identified in the detection range 83. Note that fundamentally, such objects are objects moving in the direction of progress of the vehicle 10 at a slower velocity than the velocity of the vehicle 10, objects moving in the opposite direction, or stationary objects.

Next, at step S7, as illustrated in FIG. 4A and FIG. 4B, a target position 102 for changing lanes is set in the adjacent lane 87. The target position 102 in the adjacent lane 87 is set in order to calculate an offset distance Doff in the lane width direction Y from the lane width direction Y position (current position) in the current lane 85 to the lane width direction Y target position 102 in the adjacent lane 87.

Note that in cases in which an object 90 has not been detected in the adjacent lane 87, or cases in which an object 90 has been detected at the roadside 89, the target position 102 is set to a position at half the distance L/2 of the adjacent lane width Llane=L. In cases in which an object 90 has been detected in the adjacent lane 87, as illustrated in FIG. 4B, the target position 102 is set to a position at half the distance L/2 of the adjacent lane width Llane=L or a position at half the distance Lob/2 of the adjacent lane width Llane=Lob.

Next, at step S8, determination is made as to whether or not an object 90 is present in the direction of the adjacent lane 87, this being the lane change target lane.

In cases in which it has been confirmed that there is no object present in the lane change target lane 87 or in the vicinity of the lane change target lane 87 (step S8: NO), as illustrated in FIG. 4A, at step S9, the lane change path command Tcom is calculated as normal.

Figure 5A:
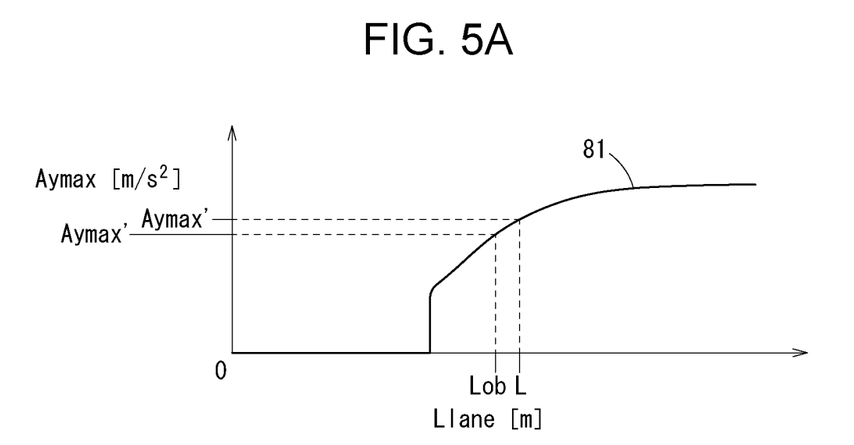
FIG. 5A is graph to explain calculation of a maximum lateral acceleration for a specific adjacent lane width.

However, in cases in which, as illustrated in FIG. 4B, the presence of an object 90 is confirmed in the adjacent lane 87, this being the lane change target lane, or in the vicinity of the lane change target lane 87 at step S8 (although not illustrated in the drawings, this includes cases in which an object is present at the roadside 89 in the state illustrated in FIG. 4A) (step S8: YES), then at step S10, as illustrated in FIG. 5A, a maximum lateral acceleration Aymax' of the vehicle 10 in the lane width direction Y is calculated for the detected adjacent lane width Llane=L, Lob by referring to the characteristics 81 for the maximum lateral acceleration Aymax of the vehicle 10 in the lane width direction Y with respect to the adjacent lane widths Llane=L, Lob respectively illustrated in FIG. 4A and FIG. 4B.

Figure 5B:
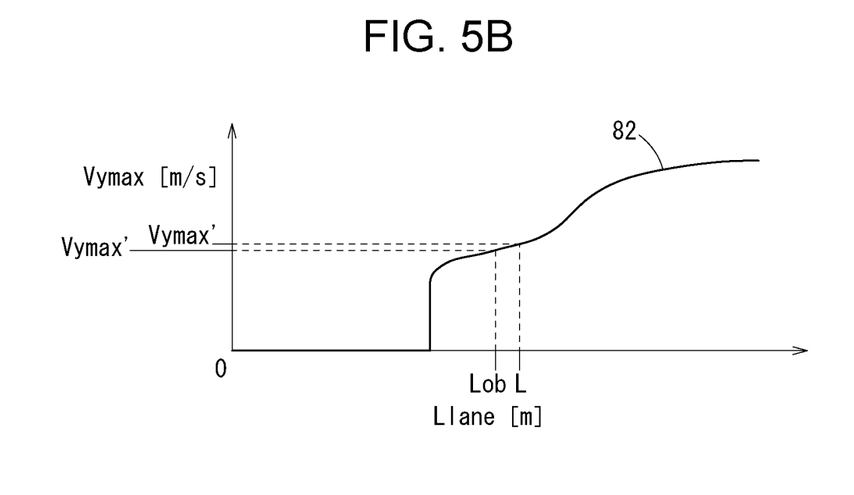
FIG. 5B is a graph to explain calculation of a maximum lateral velocity for a specific adjacent lane width.

Alternatively, at step S10, as illustrated in FIG. 5B, a maximum lateral velocity Vymax' of the vehicle 10 in the lane width direction is calculated for the detected adjacent lane width Llane=L, Lob by referring to the characteristics 82 the for the maximum lateral velocity Vymax of the vehicle 10 in the lane width direction with respect to the adjacent lane widths Llane=L, Lob respectively illustrated in FIG. 4A and FIG. 4B.

Next, at step S11, the object determination section 44 classifies the type of the object 90 detected in the surrounding environment by the lane marking/object detection section 42. Specifically, at step S11, the object 90 confirmed within the lane change target lane 87 or in the vicinity of the adjacent lane 87 (including at the roadside 89) is classified with an object type ID indicating whether the object 90 is an animal or an object other than an animal (a pedestrian, a bicycle being pedaled by a cyclist, a stationary vehicle (no possibility of door opening), or a stationary vehicle (possibility of door opening)).

When determining between a stationary vehicle in which there is no possibility that a door could open (no possibility of door opening) and a stationary vehicle in which there is a possibility that a door could open (possibility of door opening), there is determined to be a possibility of an occupant opening a door of the stationary vehicle and exiting the stationary vehicle in cases in which the vehicle 10 detects that that the engine of the stationary vehicle has been switched from an ON state to an OFF state, or in cases in which the vehicle 10 detects that the stationary vehicle has only just entered the OFF state, for example through inter-vehicle communication with the stationary vehicle using the communication device 37.

At step S11, in cases in which the object 90 is an animal such as a deer and the object type ID is classified as ID=ex, the subsequent steps S12 and step S9 (lane change path generation steps) are skipped and the lane change path command Tcom is not generated, since the behavior of animals is generally difficult to predict. Note that similarly to in cases in which the object 90 is an animal, the ID=ex is also applied in cases in which the type ID of the object 90 cannot be classified, and step S12 and step S9 (lane change path generation steps) are skipped and the lane change path command Tcom is not generated. However, configuration may be made such that in cases in which an animal has been identified specifically, only step S12, described later, is skipped, and the lane change path command Tcom may be generated at step S9 based on the result of step S10.

In the determination at step S11, in cases in which the object 90 is classified with a type ID of an object other than an animal (a pedestrian, a bicycle being pedaled by a cyclist, or a stationary vehicle), a type ID=1 is applied to a bicycle being pedaled by a cyclist, a type ID=2 is applied to a pedestrian, a type ID=3 is applied to a stationary vehicle (no possibility of door opening), and a type ID=4 is applied to a stationary vehicle (possibility of door opening).

Figure 6:
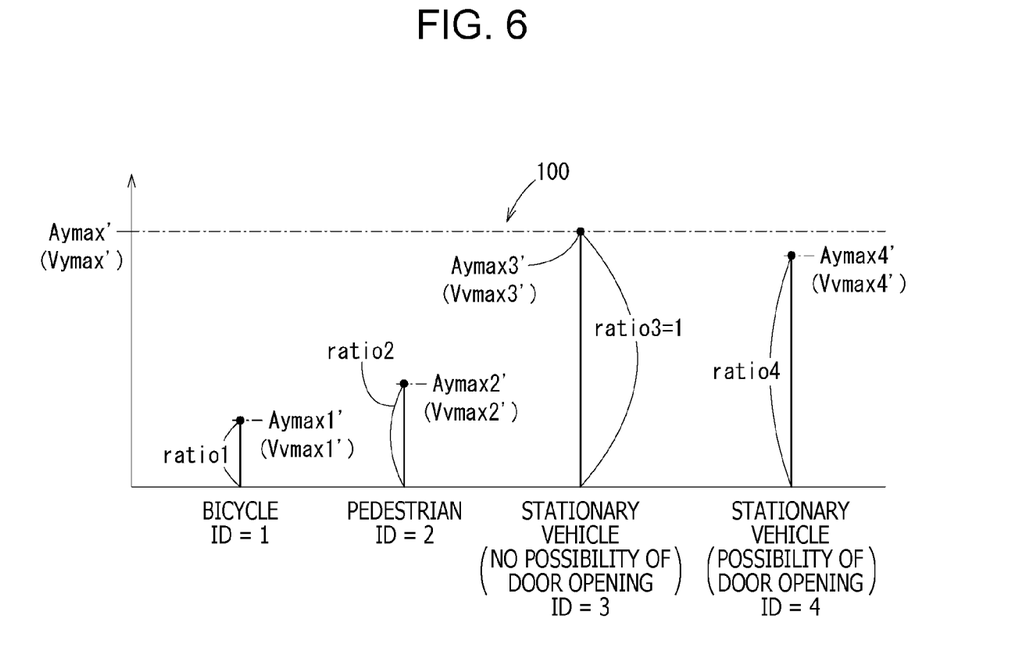
FIG. 6 is a diagram illustrating reduction ratios for maximum lateral acceleration or maximum lateral velocity according to object types.

Next, at step S12, a table (map) 100 of reduction ratios for the maximum lateral acceleration Aymax' or the maximum lateral velocity Vymax' corresponding to the object type IDs illustrated in FIG. 6 is referenced.

If the reduction ratio for the type ID=1 for a bicycle being pedaled by a cyclist is ratio1, the reduction ratio for the type ID=2 for a pedestrian is ratio2, the reduction ratio for the type ID=3 for a stationary vehicle (no possibility of door opening) is ratio3=1 (value 1), and the reduction ratio for the type ID=4 for a stationary vehicle (possibility of door opening) is ratio4, then the applied values have the relationship 0<ratio1<ratio2<ratio4<ratio3=1.

At step S12, a maximum lateral acceleration AymaxID' after reducing the maximum lateral acceleration Aymax of the vehicle 10 in the lane width direction Y, or a maximum lateral velocity VymaxID' after reducing the maximum lateral velocity Vymax of the vehicle 10 in the lane width direction, is calculated according to the object type ID classified at step S11, using the respective Equations 3 and 4 below.

In Equation 3 and Equation 4, the functions Fa(ID) and Fv(ID) are functions that, based on FIG. 6, determine a reduction ratio called ratio to reduce the lateral acceleration Aymax' or the lateral velocity Vymax' calculated using the characteristics 81 or the characteristics 82 respectively illustrated in FIG. 5A and FIG. 5B.

$$AymaxID'=Fa(ID) \times Aymax' \quad (3)$$

$$VymaxID'=Fv(ID) \times Vymax' \quad (4)$$

Accordingly, the reduced maximum lateral acceleration AymaxID' and the reduced maximum lateral velocity VymaxID' are calculated according to the classified object type ID in the following manner.

| | | |
|---|---|---|
| Bicycle | ID = 1 | Aymax1' = ratio1 × Aymax' |
| | | Vymax1' = ratio1 × Vymax' |
| Pedestrian | ID = 2 | Aymax2' = ratio2 × Aymax' |
| | | Vymax2' = ratio2 × Vymax' |
| Stationary vehicle (no possibility of door opening) | ID = 3 | Aymax3' = ratio3 × Aymax' = Aymax' |
| | | Vymax3' = ratio3 × Vymax' = Vymax' |
| Stationary vehicle (possibility of door opening) | ID = 4 | Aymax4' = ratio4 × Aymax' |
| | | Vymax4' = ratio4 × Vymax' |

Next, at step S12, the lane change path command Tcom is generated based on the reduced maximum lateral acceleration AymaxID' or the reduced maximum lateral velocity VymaxID', together with the velocity or acceleration of direction X and the offset distance Doff.

Figure 7:
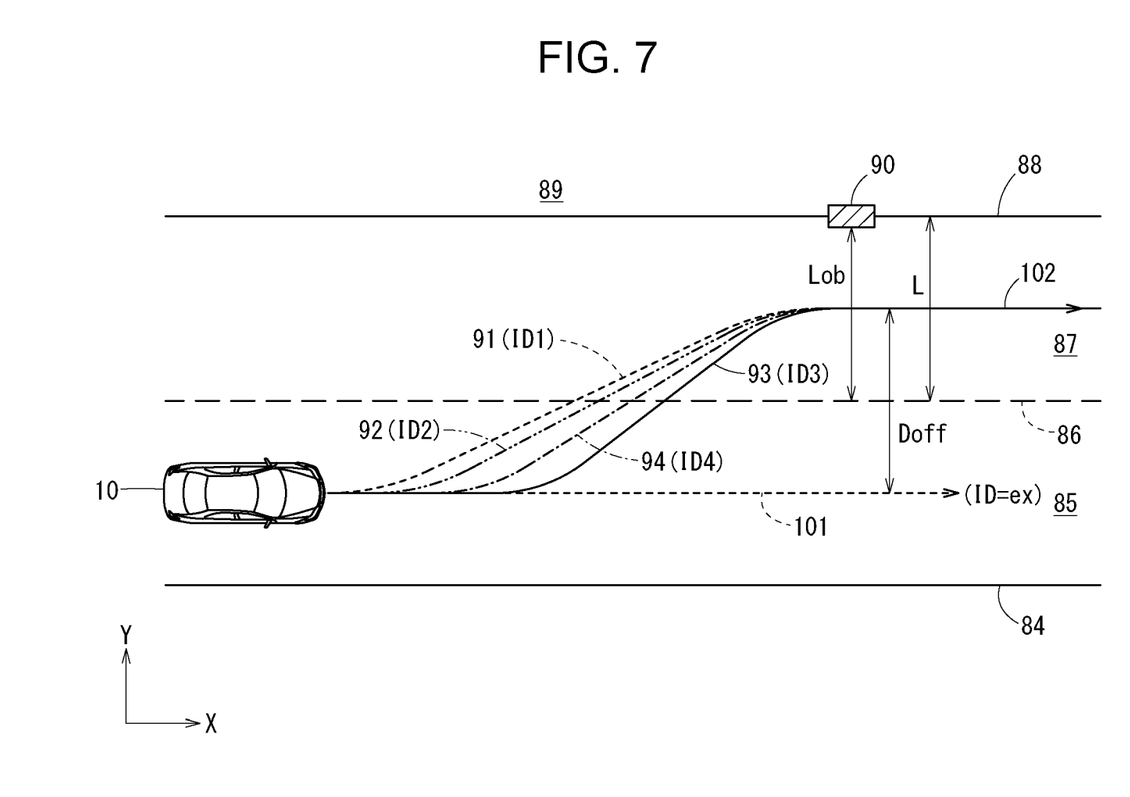
FIG. 7 is a schematic plan view illustrating examples of lane change paths generated according to object types.

FIG. 7 is a plan view schematically illustrating examples of lane change path commands Tcom=91 (ID1), 92 (ID2), 93 (ID3), and 94 (ID4) generated according to the object type ID for cases in which an object 90 has been detected in the adjacent lane 87.

The lane change path command Tcom=91 (ID1) is calculated in cases in which the object 90 is a bicycle being pedaled by a cyclist. The lane change path command Tcom=92 (ID2) is calculated in cases in which the object 90 is a pedestrian. The lane change path command Tcom=93 (ID3) is calculated in cases in which the object 90 is a stationary vehicle (no possibility of door opening). The lane change path command Tcom=94 (ID4) is calculated in cases in which the object 90 is a stationary vehicle (possibility of door opening). Namely, the lane change path command Tcom is calculated appropriately and accurately according to the type ID of the object 90.

Thereafter, in lateral velocity VymaxID' control, the lane change controller 46 performs automatic lane change control by controlling the steering angle of the steering device 62 according to the calculated lane change path command Tcom. In lateral acceleration AymaxID' control, the lane change controller 46 performs automatic lane change control by controlling the steering angle of the steering device 62 and controlling to increase the drive force of the drive device 64 according to the calculated lane change path command Tcom.

Summary of Embodiment

The lane change control system 12 according to the embodiment described above includes the surrounding environment sensors 30 and the like as a surrounding environment acquisition section that acquires the surrounding environment at least in front of the vehicle 10, the lane marking/object detection section 42 that detects lane markings and an object 90 in the acquired surrounding environment, the lane change controller 46 that controls lane changing of the vehicle 10 according to the lane markings and object 90 detected, and the object determination section 44 that determines whether or not the object 90 detected in the surrounding environment is present in the lane change target adjacent lane 87 or in the vicinity of the adjacent lane 87.

Here, when the detected object 90 has been determined to be an object 90 present in the lane change target adjacent lane 87 or in the vicinity of the adjacent lane 87, the lane change controller 46 performs lane change control using the predetermined maximum lateral acceleration Aymax' with respect to the lane width Llane=L, Lob of the lane change target lane (adjacent lane) 87 illustrated in FIG. 5A, or using the predetermined maximum lateral velocity Vymax' with respect to the lane width Llane=L, Lob of the lane change target lane (adjacent lane) 87 illustrated in FIG. 5B.

In this manner, in cases in which the object 90 detected by the lane marking/object detection section 42 is determined to be an object 90 present in the lane change target lane 87 or in the vicinity of the adjacent lane 87, lane change control is performed in which the predetermined maximum lateral acceleration Aymax' or maximum lateral velocity Vymax' is reduced according to the lane width Llane=L, Lob of the adjacent lane 87. Accordingly, it is possible to avoid alarming an occupant of the vehicle 10 attempting to change from a current position 101 in the lane 85 to the target position 102 in the adjacent lane 87.

Here, the object determination section 44 includes functionality to classify the type ID of the detected object 90. Accordingly, the lane change controller 46 is capable of setting an appropriate reduction ratio ratio for the maximum lateral acceleration Aymax' or the maximum lateral velocity Vymax' according to the classified type ID of the object 90 by changing the reduction ratio ratio so as to reduce the maximum lateral acceleration Aymax' or the maximum lateral velocity Vymax' according to the classified type ID of the object 90.

More specifically, when the detected object 90 is a person, namely a pedestrian, and the type ID is classified as ID=2, the lane change controller 46 changes the reduction ratio ratio such that the maximum lateral acceleration Aymax' or the maximum lateral velocity Vymax' becomes smaller than for an object 90 other than a person, namely the stationary vehicle (no possibility of door opening) ID=3 and the stationary vehicle (possibility of door opening) ID=4 in the present embodiment (ratio2<ratio3, ratio4). This thereby avoids alarming the person present in the adjacent lane 87 or in the vicinity of the adjacent lane 87 into which the vehicle 10 is attempting to change, and at the same time, avoids alarming occupants of the vehicle 10 that is attempting to change from the lane 85 to the lane 87.

Note that when the person who has been detected and classified is riding a bicycle (a cyclist pedaling a bicycle), the reduction ratio ratio is changed from the ratio2 to the ratio1 such that the maximum lateral acceleration Aymax2' or the maximum lateral velocity Vymax2' becomes smaller than when using the reduction ratio ratio2 for a pedestrian (becomes the maximum lateral acceleration Aymax1' or the maximum lateral velocity Vymax1'). This thereby avoids alarming the person riding a bicycle (cyclist pedaling a bicycle) present in the adjacent lane 87 or in the vicinity of the adjacent lane 87 into which the vehicle 10 is attempting to change, and at the same time, avoids alarming occupants of the vehicle 10 that is attempting to change from the lane 85 to the adjacent lane 87. Note that a bicycle being pedaled by a cyclist has a greater sideways wobble with respect to the direction of progress than a pedestrian.

Since a stationary vehicle (no possibility of door opening) has no sideways wobble with respect to the direction of progress, the reduction ratio ratio3 is set to ratio3=1. However, the reduction ratio is changed to the reduction ratio ratio4 (ratio4<ratio3) for a stationary vehicle (possibility of door opening), such that the maximum lateral acceleration Aymax' or the maximum lateral velocity Vymax' becomes smaller than when employing the reduction ratio ratio3 for a stationary vehicle (no possibility of door opening), in consideration of the fact that an occupant may exit the stationary vehicle. Setting in this manner enables the maximum lateral acceleration Aymax4' or the maximum lateral velocity Vymax4' to be set using the reduction ratio ratio4 that is more appropriate for a stationary vehicle when there is a possibility of the door opening.

Note that as illustrated in FIG. 2A and FIG. 5A, and in FIG. 2B and FIG. 5B, the predetermined maximum lateral acceleration Aymax (Aymax') or maximum lateral velocity Vymax (Vymax') is set with smaller values the narrower the lane change target lane width Llane. This thereby enables the change from the lane 85 to the lane change target adjacent lane 87 to be controlled at an appropriate speed that neither alarms the occupant, nor feels slow to the occupant.

In this manner, in the present embodiment, lane change control is performed based on the adjacent lane information Llaneinfo combining the adjacent lane width Llane information and the adjacent object information Obinfo. This thereby enables lane change control to be performed appropriately, without alarming the occupant of the vehicle 10, or the other person in cases in which the object 90 is a pedestrian or the like.

Note that the present disclosure is not limited to the embodiment described above, and obviously various configurations may be adopted based on the contents of the present specification.

For example, the object type is classified at step S11 described above. However, there is no limitation thereto, and the type of the object 90 may be classified earlier when determining the presence or absence of the object 90 at step S8.

Configuration may be made such that steps S10, S11, and S12 are skipped so as to proceed to step S9 (lane change path generation) and calculate the lane change path command Tcom as normal in cases in which an object (static roadside object) has been determined to be present (step S8: YES) and has been determined to be a static roadside object present at the roadside 89, such as guard rail or a pole, as a result of earlier classification of the object 90 type.

In cases in which the object 90 has been determined to be a bicycle, pedestrian, stationary vehicle, or animal as a result of the earlier classification of the object 90 type, processing transitions to step S10 and S11, and the reduction ratio is selected according to the object type.

This thereby enables unnecessary control (steps S10, S11, S12) to be omitted for stationary roadside objects that do not pose an obstacle to normal lane changing, since the occupant would not be alarmed even were normal lane changing to be performed.

What is claimed is:

1. A lane change control system comprising:
a surrounding environment acquisition section configured to acquire image data of a surrounding environment at least in front of a vehicle;
   a lane marking/object detection section configured to detect a lane marking and an object in the surrounding environment based on the acquired image data of the lane marking and the object and obtain information regarding the object;
   a lane change controller configured to perform lane changing of the vehicle to a target position in a lane change target lane by controlling a predetermined lateral acceleration or lateral velocity according to the lane marking and object detected, the lane change target lane being defined by an adjacent lane boundary on a side of the vehicle and a distant lane boundary on an opposite side; and
   an object determination section configured to determine whether or not the object detected in the surrounding environment is present in the lane change target lane or in the vicinity of the lane change target lane such that the object has a part which projects into the lane change target lane beyond the distant lane boundary, wherein
the lane change controller is configured to set the target position between the part of the detected object and the adjacent lane boundary and to reduce the predetermined lateral acceleration or lateral velocity for the lane change control in cases in which the part of the detected object has been determined to be present in the lane change target lane.

2. The lane change control system of claim 1, wherein
the information regarding the object comprises a type of the object, the object determination section being further configured to classify the detected object by the type, and
   the lane change controller changes a reduction ratio of the lateral acceleration or the lateral velocity according to the classified type of the detected object.

3. The lane change control system of claim 2, wherein
the object determination section is further configured to determine whether the type of the detected object is a person or an object other than a person according to the information regarding the object, and
the lane change controller changes the reduction ratio to be smaller in cases in which the type of the detected object is a person, as compared to cases in which the type of the object is an object other than a person.

4. The lane change control system of claim 3, wherein
the object determination section is further configured to determine, when the type is a person, whether the type of the person is a pedestrian or a person riding a bicycle, and
the lane change controller changes the reduction ratio to be smaller in cases in which the detected person is a person riding a bicycle, as compared to cases in which the person is a pedestrian.

5. The lane change control system of claim 1, wherein the predetermined lateral acceleration or lateral velocity is set to a smaller value the narrower a lane change target lane width.

6. The lane change control system of claim 2, wherein
the object determination section is further configured to determine whether the type of the detected object is a stationary vehicle and whether the stationary vehicle is a type of a vehicle considered to have a possibility that an occupant gets out from the vehicle or a type of a vehicle considered to have no possibility that an occupant gets out from the vehicle,
the lane change controller changes the reduction ratio to be smaller in cases in which the detected object has been determined to be a stationary vehicle present in the lane change target lane or in the vicinity of the lane change target lane and considered to have a possibility that an occupant gets out from the vehicle, as compared to cases in which the object has been determined to be a stationary vehicle considered to have no possibility that an occupant gets out from the vehicle.

* * * * *